Inventor
Joseph F. Joy

April 1, 1947.    J. F. JOY    2,418,123
HYDRAULIC WHEEL MOTOR FOR VEHICLES
Filed Jan. 14, 1942    4 Sheets-Sheet 4

Inventor
Joseph F. Joy
By D. J. Kessenich & J. H. Church
Attorneys

Patented Apr. 1, 1947

2,418,123

UNITED STATES PATENT OFFICE 2,418,123

HYDRAULIC WHEEL MOTOR FOR VEHICLES

Joseph F. Joy, Claremont, N. H.

Application January 14, 1942, Serial No. 426,730

13 Claims. (Cl. 180—66)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a hydraulic motor and more particularly to such a motor adapted for use as a vehicle wheel.

In hydraulic motors for use in vehicles it is desirable that means be provided to insure a relatively high torque output in starting or under stalled conditions. At the same time it is desirable that, under easier running conditions, the characteristics of the motor be so modified as to permit of high speed, with a given size of driving pump.

When a hydraulic motor is used directly in a vehicle wheel several important advantages result, notably in the simplification which results from the elimination of costly gear drives, transmissions, differentials, etc. Further, such hydraulic driving makes possible acceleration and deceleration through infinite ranges of both forward and reverse movement, steering through setting up of a speed differential between wheels on opposite sides of a vehicle, and retardation and locking of the wheels without auxiliary brake equipment.

It is therefore an object of this invention to produce a compact, highly efficient hydraulic motor capable of functioning as a vehicle wheel.

It is a further object to simplify the manufacture and maintenance of such a wheel motor.

It is a further object to provide means by which the displacement of a hydraulic motor can be reduced under light loads to permit of higher speed when driven from a pump of given maximum displacement.

The specific nature of the invention as well as other objects and advantages thereof will clearly appear from a description of a preferred embodiment as shown in the accompanying drawing in which:

Figure 3 is a sectional view of the valve mechanism taken on the line 3—3 of Fig. 1.

Figure 1:
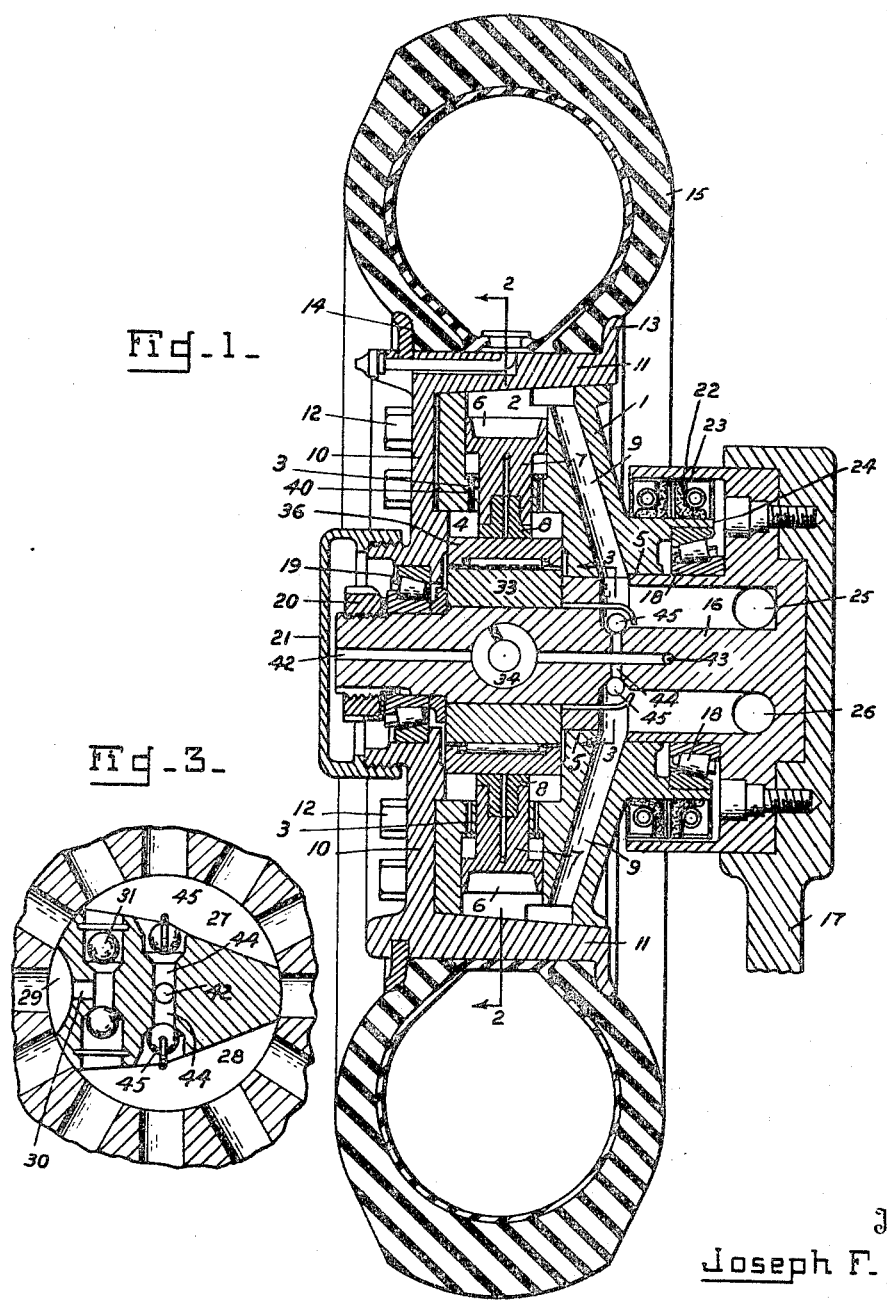
Figure 1 is a cross sectional view of a wheel motor embodying my invention.
Figure 2:
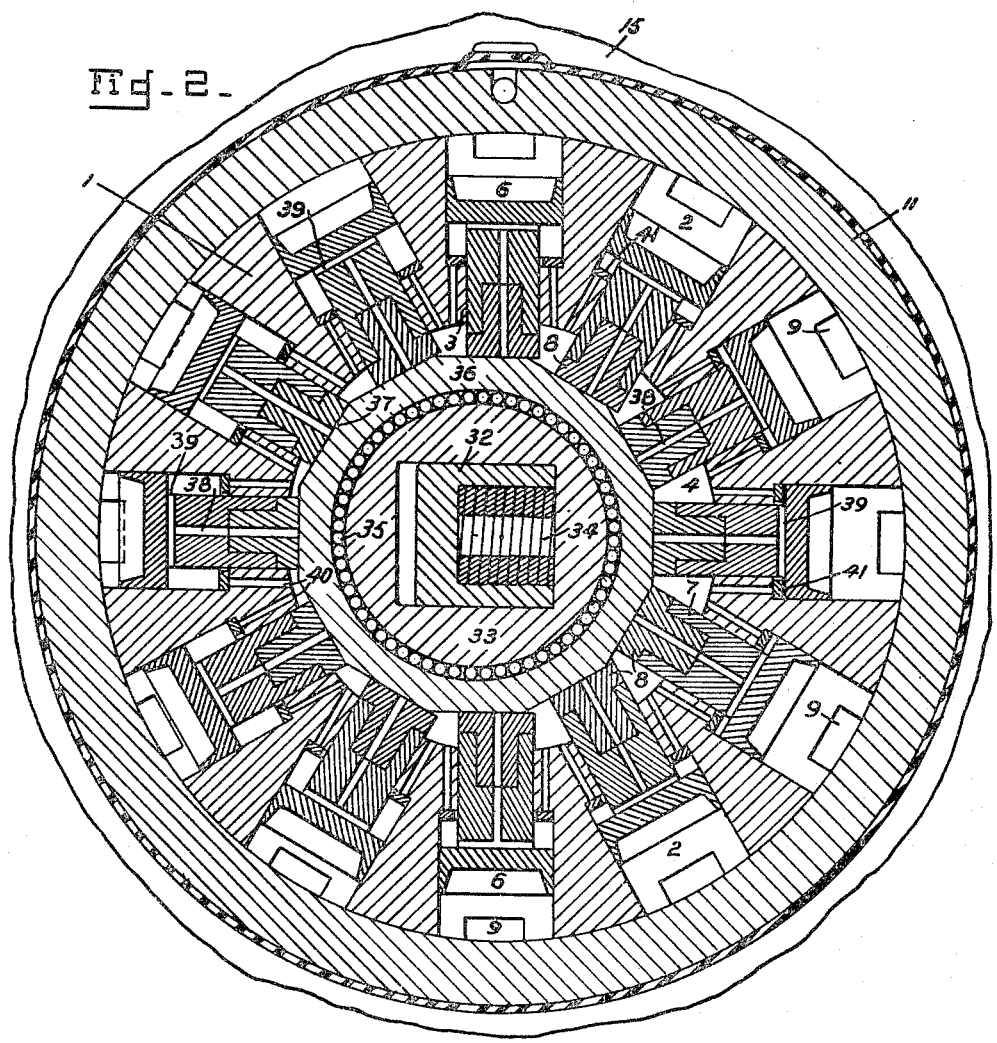
Figure 2 is a sectional view of a part of the motor taken on the line 2—2 of Figure 1.

Referring to the drawing by characters of reference there is shown in Figure 1 a vehicle wheel comprising a body 1 formed with a plurality of spaced radial cylinders 2. Diametrically reduced portions 3 of said cylinders communicate with a cylindrical chamber 4 in the body 1 and coaxial therewith. A valve chamber 5 coaxial with the chamber 4 communicates between the chamber 4 and the end of the body. A piston 6 is fitted in each of the cylinders and provided with a portion 7 extending through the reduced portion 3 of the cylinder. The portion 7 of the piston 6 is provided with an insert 8 of more wear resistant metal. Angular bores 9 connect the head of each cylinder with the valve chamber 5. The outer circumferential portion of the body 1 may be machined to frusto conical form, and a disk 10 has a rim 11, the inner part of which is formed to frusto conical shape adapted to coact with the outer circumference of the body 1 and seal the heads of the cylinders. Bolts 12 through the disk and engaging the body 1 may secure the disk to the body of the wheel. The rim may be provided with an integral flange 13 and a releasable flange 14 to accommodate a pneumatic tire 15. An axle 16 is adapted to be secured to the body of a vehicle 17 and is provided with bearings 18 and 19 engaging respectively the body 1 and the disk 10. A nut 20 or similar means on the end of the axle retains the wheel thereon and a cap 21 prevents any escape of oil from the disk side of the wheel. A grease retainer 22 may be engaged between an annular sleeve 23 on the axle and a cylindrical surface 24 on the body to prevent the escape of oil therethrough. Passages 25 and 26 lead from the oil supply and exhaust lines through the axle 16 to the portion of the axle inside the chamber 5 and in alignment with the openings thereinto of the angular bores 9. The passages 25 and 26 open into opposite ports 27 and 28 of a valve formed in the shaft by the removal of portions of the shaft as best shown in Fig. 3. It will be seen that in this way pressure may be applied to the group of cylinders in communication with one port of the valve while those cylinders in communication with the other port of the valve are connected to the exhaust line. A third port 29 functions to connect the passage 9 opposed thereto, through a passage 30 and one or the other of the ball check valves 31 to whichever of the ports 27 and 28 is connected to the exhaust line. The portion 32 of the shaft contained in the chamber 4 is squared and may be somewhat eccentric with relation to the rest of the shaft as best shown in Fig. 2 and a circular collar 33, eccentric with relation to the shaft is mounted thereon for radial sliding movement in opposition to the force of a spring 34 into a position in which it will have greater eccentricity with relation to the shaft. Surrounding the collar and, preferably through the interposition of roller bearings 35, rotatable thereon is a band 36 having flats 37 on its outer circumference parallel to the faces of and adapted to engage the inserts 8 in the inner ends of the pistons 6.

In the operation of the wheel motor it may be assumed that a fluid medium under pressure has been allowed to flow to the wheel motor through the passage 26. At the same time the passage 25 has been connected to the exhaust line or to the inlet side of a hydraulic pump applying pressure to the passage 26. The fluid which entered through the passage 26 will pass to the valve port 28 and will pass therefrom through the passages 9 to the heads of the cylinders presently in communication therewith. As the cylinders in communication with the port 27 will be open to the exhaust, a difference of pressure will exist across the band 36 and the cylinders below the center line in Figure 2 and to which pressure is applied will tend to repel the band which will cause rotation of the wheel with respect to the shaft in a direction in which the band will be brought nearer to the center of the shaft. As seen in Figure 2 the rotation will be counterclockwise when pressure is applied through passage 26. Rotation of the wheel places other passages 9 successively in communication with the port 28 and the rotation will continue until the supply of fluid is stopped. As the system is symmetrical it will be obvious that reversal of the flow of fluid to the motor will result in reversal of rotation.

The ability of the collar 33 to slide radially on the squared shaft is utilized to provide for variable displacement and variable torque. As the third port 29 of the valve is, through a ball valve 31, in communication with the port 27, an unbalance of pressure will exist which tends to move the band and collar radially to the left as seen in Fig. 2. Such movement will be opposed by and the tendency to move under this unbalanced pressure may be said to be weighed by the spring 34. Compression of the spring will result in an increase of the eccentricity of the collar 33 with relation to the shaft 16 thus lengthening the stroke of the pistons 6 and increasing the available torque output. As the demand for torque drops the spring will be able to more completely overcome the difference in pressure thus decreasing the eccentricity of the collar and the strokes will be shortened with consequent increase in the possible rate of rotation for given displacement. This variation in displacement will take place automatically during rotation in either direction in response to load variations.

High contact pressures will exist between the inserts 8 and the flatted portions 37 of the band 36 during the power stroke. Accordingly means have been provided by which this contact is made with a cushion of oil between the surfaces. An axial passage 38 has been formed through the piston insert 8 and reduced portion 7 of the piston and radial bores 39 place this passage in communication with the cylinder bore 2 in rear of the piston 6. Openings 40 communicating with the chamber 4 have been formed in the body 1 and an annular valve member 41 is provided in the cylinder to close these openings when internal pressure is exerted in the cylinder behind the piston. During the exhaust stroke of the pistons oil is drawn from the chamber 4 into the space behind the piston. As the power stroke of the piston is commenced the annular valve 41 will close and the trapped oil will be discharged through the passage at the face of the insert 8 thus virtually floating the piston on a cushion of oil. As the actual volume of oil so displaced need not be great to maintain a cushioning film which will reduce friction and considerably increase the life of the parts in contact, a negligible amount of energy will be absorbed by forcing the oil through the orifice.

In the operation of machinery of this kind, due to the impossibility of securing absolutely perfect running fits and to the requirement of allowing sufficient oil flow to lubricate all running surfaces, it is unavoidable that some fluid should work its way to the ends of the shaft where it might tend to escape. Accordingly an axial bore 42 has been formed in the shaft 16 and radial bores 43 have been formed intersecting with the bore 42 and placing said bore in communication with the chamber housing the bearing 18. Other radial bores 44 connect the axial bore with both of the valve ports 27 and 28 and it will be seen that the ball valves 45 will permit fluid to flow from the axial bore only into the valve port which is not supplied with fluid under pressure. In this way any excess of oil which finds its way into the space adjacent the retainer 22 or into the cap 21 will be permitted to return to the exhaust line from the motor regardless of the direction of rotation and without opportunity to build up a high pressure against the oil sealing means.

This type of wheel motor may be accelerated or decelerated through wide limits by the use of interconnected valves which govern the flow of fluid to and from the wheel. When the valves are so positioned as to restrict or to stop entirely the flow to and from the wheel, the motor will correspondingly decelerate or lock itself in fixed position. In the event that the control valves were suddenly thrown to stopped position, the tendency of the wheel motor to act as a pump might burst the piping or cause other damage to the system. Accordingly it is contemplated that relief valves will be provided in the control equipment to prevent the building up of pressures beyond the ability of the apparatus to withstand.

Figure 4:
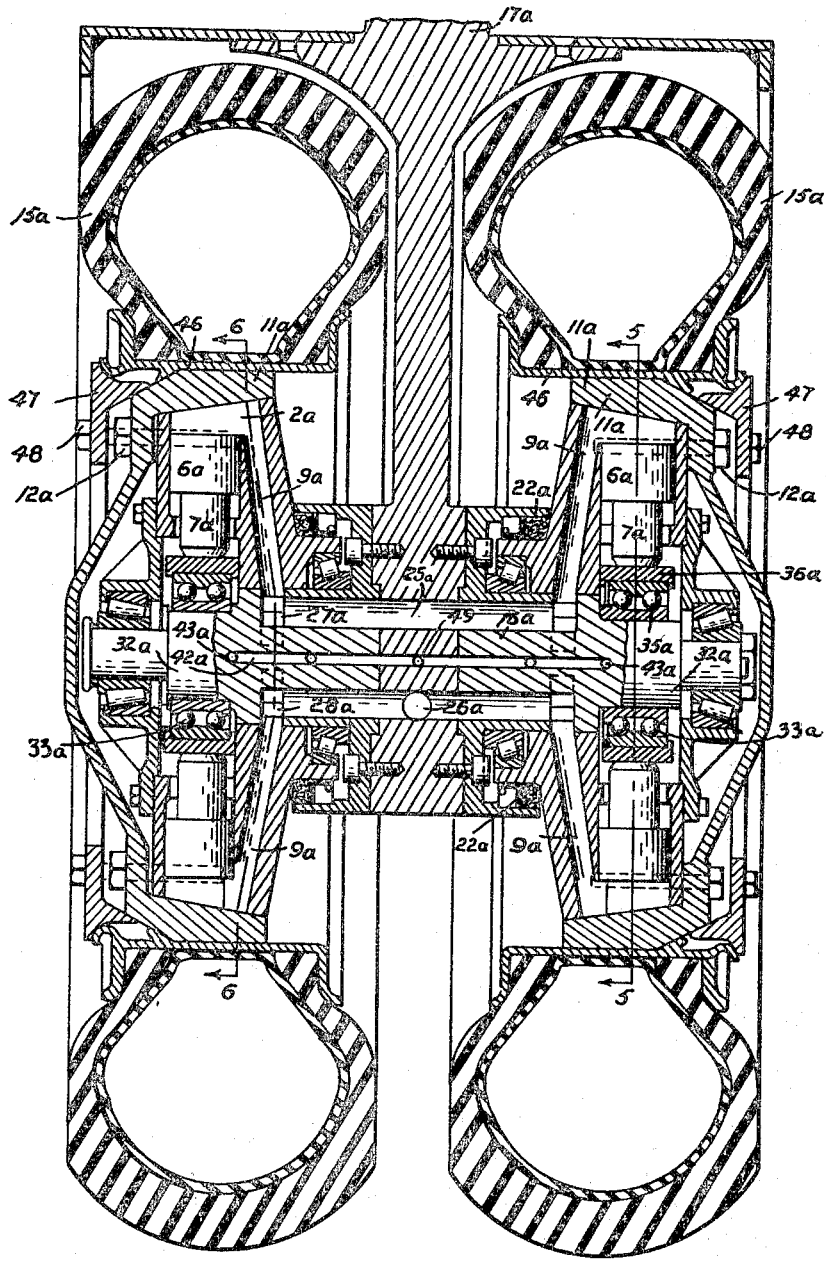
Figure 4 is a cross sectional view of a modified form of wheel motor mounted in paired relation.
Figure 5:
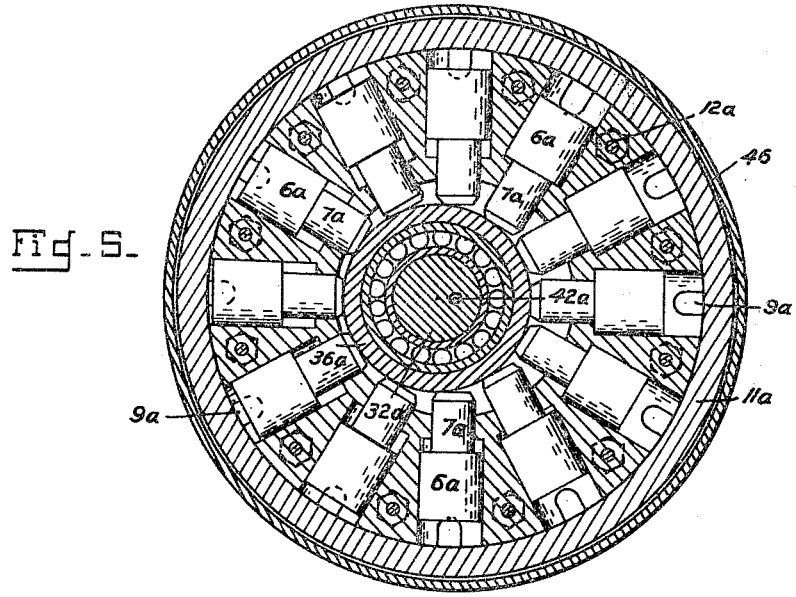
Figure 5 is a sectional view on the line 5—5 of Fig. 4.
Figure 6:
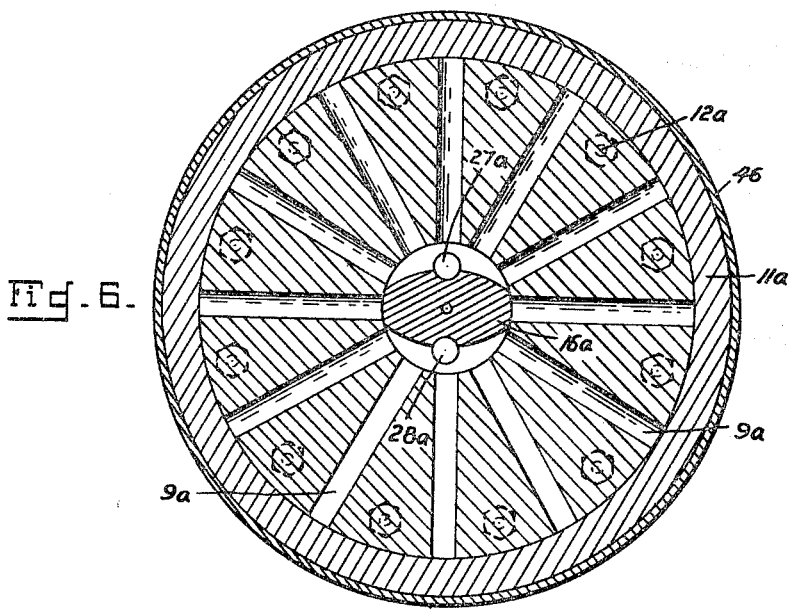
Figure 6 is a similar view on the line 6—6 of Fig. 4.

Figures 4 to 6 show a modified form of wheel motor of constant displacement. This motor is essentially the same as that previously discussed and reference numerals applied to the modified form differ only by the suffix (a) from those applied to similar parts in the form shown in Figure 1. The differences of construction involved in the change to constant displacement are the replacement of the squared portion 32 of the shaft 16 by an eccentric circular portion 32a on the shaft 16a. A bearing having a race 33a, ball bearings 35a and a band 36a is mounted on the eccentric portion 32a of the shaft and engages the portion 7a of the pistons 6a. As the bases of the pistons 6a will have a rocking movement on the band 36a no means need be provided to introduce lubricant therebetween. The valving arrangement is also simplified by the omission of the feature of variable displacement. The ports 27a and 28a communicate through passages 9a with the heads of the cylinders 2a and these ports are supplied respectively by feed lines 25a and 26a.

For the purpose of illustration it may be assumed that fluid under pressure is supplied to the motor through the feed passage 26a. Through the port 28a and passages 9a this pressure will be applied to all of those pistons below the horizontal center line in Fig. 4 while those pistons above that center line will be connected through port 27a to the exhaust line. Obviously those pistons under pressure will tend to so position themselves as to force the band on the eccentric as near as possible to the center line of the shaft and as each piston in turn arrives at that position pressure is removed therefrom. Rotation will be in counterclockwise direction as seen in Fig. 5 when pressure is applied through the passage 26a and will be reversed when the direction of flow is reversed. As in the Figure 1 modification closure of both passages 25a and 26a will result in locking the motor against rotation.

In the modification of the invention shown in Fig. 4 demountable rims 46 have been used to secure the tires 15a on the rims 11a. A clamping ring 47 is secured by nuts 48 on extensions of the disk securing bolts 12a. This type of rim can be used with either type of wheel motor.

Figure 4 also shows the mounting of wheel motors in dual form to some portion of a vehicle body 17a. When conventional dual wheels are used there is a tendency for considerable slippage to take place on turns of a short radius due to the lack of any differential action between the wheels. Particularly with large tire sizes which must be widely spaced, this causes greatly increased wear on the tires. Such a difficulty is overcome by the use of separate hydraulic wheel motors in dual form as such motors are capable of automatically dividing the loads to provide for differential action between the wheels. This feature will facilitate steering and greatly increase the life of tires and may be applied to either type of wheel motor.

In the modification shown in Fig. 4 an axial bore 42a has been provided through the length of the shaft 16a and radial bores 43a are provided intersecting the axial bore and placing it in communication with each of the cavities housing the bearings. A passage 49 in the body of the vehicle may, by suitable tubing, be placed in communication with the oil supply tank to return thereto any surplus of oil which might otherwise tend to escape through the oil seals 22a.

I claim:

1. A hydraulic motor comprising a shaft adapted to be fixed to a vehicle body, a motor body journaled on said shaft, a plurality of radial cylinders in said motor body, said shaft being squared in the portion thereof opposed by said cylinders, a circular collar eccentrically mounted and radially slidable in one direction on said squared portion, a spring engaged between said squared portion and said collar tending to slide the collar into a position of less eccentricity, pistons in said cylinders, means by which the thrust of said pistons may be applied to said collar, valve means on said shaft adapted to communicate with pressure and exhaust means, and passages in said body through which the head of each cylinder communicates with said valve means, said valve means being so constructed and arranged that at any instant, taking as a reference point the end, toward which said collar is impelled, of the radial line along which the said spring tends to move said collar, a group of cylinders, including more than half of the total of said cylinders and taken consecutively in a given direction around said body from said reference point, will be in communication with said exhaust means, while the remainder of the cylinders will be in communication with said pressure means.

2. A hydraulic motor comprising a shaft having a squared portion thereon, a circular collar having a rectangular hole therethrough, the minor dimension of said hole being slightly greater than that of said squared shaft, said collar being eccentrically mounted on said squared portion and radially slidable thereon in the direction of the major dimension of said hole, a spring between said collar and said shaft tending to shift said collar to a position of less eccentricity, radial pistons engaging said collar and valve means on said shaft adapted to control the supply of pressure to said pistons in such a way that a component of the piston thrust tends to oppose said spring and move said collar into a position of greater eccentricity.

3. In a hydraulic motor a valve comprising a circular member having three segmental portions removed from the circumference thereof, one of said segmental portions defining a valve port more than one-twelfth of the circumference in extent, the other two of said segmental portions defining valve ports equally and oppositely spaced in relation to a line bisecting said first mentioned valve port, said spaced ports being each more than one-third of the circumference in extent, unremoved segments of said circular member separating said valve ports, apertures placing said first mentioned port in communication with each of said spaced ports and a valve in each of said apertures adapted to permit flow through the aperture only when the pressure in said first mentioned port exceeds that in the spaced port with which the aperture communicates.

4. A hydraulic motor comprising a shaft, a valve formed in the surface of said shaft as described in claim 3, passages in said shaft communicating with each of said spaced ports, a body rotatable about said shaft, a plurality of radial cylinders in said body, passages in said body communicating between the head of each cylinder and said valve, a circular collar on said shaft and eccentric with relation to the axis of said shaft, the center of said collar being offset in a direction toward the side of said shaft in which said first mentioned valve port is formed, spring means adapted to move said collar to a position of less eccentricity in a direction along a radial line coplanar with that bisecting said first mentioned valve port, means on said collar adapted to transmit thrust thereto, and pistons in said cylinders and engaging said thrust transmitting means.

5. Displacement regulating means for a hydraulic motor comprising a shaft, an eccentric collar radially slidable on an eccentric squared portion of said shaft between positions of minimum and maximum eccentricity, a spring disposed between said squared portion of said shaft and said collar tending to move said collar to a position of minimum eccentricity and working pressure responsive means tending to move said collar to a position of maximum eccentricity.

6. In a hydraulic motor, pistons, a shaft having over a part thereof a squared portion eccentric with relation to the rest of said shaft, an eccentric collar on said shaft adapted to receive piston thrust, a spring disposed between said squared portion of said shaft and said collar and tending to slide said collar into a position of minimum eccentricity, and means responsive to pressure against said pistons tending to move said collar to a position of maximum eccentricity.

7. In a hydraulic motor, a shaft having over a part of its length a squared portion eccentric with relation to the rest of said shaft, an eccentric collar on the shaft, pistons bearing on the collar, a spring disposed between said squared portion of said shaft and said collar tending to move the collar to a position of minimum eccentricity, and means to cause a component of piston thrust to move the collar toward a position of maximum eccentricity.

8. In a hydraulic motor, a body, a cylinder in said body having a portion of restricted diameter, a piston in said cylinder having a portion of reduced diameter closely fitting and reciprocable through the restricted portion of the cylinder, a flat end on said piston adapted for thrusting and sliding engagement with a flat surface, an axial bore through the portion of the piston of reduced diameter and having openings communicating with said cylinder between the unreduced part of said piston, and the restricted part of said cylinder passages through said body adapted to carry a lubricating fluid to the space between the unreduced part of said piston and said portion of the cylinder of restricted diameter, and valve means adapted to close said passages when said piston is being moved toward the said restricted portion of the cylinder whereby said lubricating fluid is ejected through said axial bore to form a fluid cushion between the flat end of the piston and the surface with which it engages.

9. A wheel motor, comprising: a motor body having a plurality of cylinders, each opening into the circumferential surface of said body, said circumferential surface being tapered; and a tire rim, having a tapered surface complementary to said body surface; and means for holding said tire rim to said body, constructed and arranged to draw the complementary surfaces onto each other to seal said cylinders.

10. A wheel motor, comprising: a motor body, the circumferential portion thereof being frustro-conical in formation, said body having a plurality of radially extending cylinders, each opening into said frustro-conical portion; a tire rim, having an inner surface complementary to said frustro-conical portion; and means for holding said tire rim assembled with said motor body, constructed and arranged to draw said rim onto said frustro-conical surface to thereby seal each of said cylinder openings.

11. A hydraulic motor, comprising: a body having a plurality of cylinders; pistons reciprocable in said cylinders; a shaft having a non-circular portion; a collar having a non-circular opening fitting said portion in slidable but non-rotational relation so that said collar may shift laterally with respect to the axis of said shaft yet be in driving relation with said shaft; resilient means urging said collar to one position with respect to said shaft; and means responsive to cylinder working pressure to move said collar from said one position.

12. A wheel motor, comprising: a motor body having a plurality of cylinders, each opening into the circumferential surface of said body, said circumferential surface being tapered; tire supporting means, having a tapered surface complementary to said body surface, the complementary surfaces being of sufficient continuity so that they may be drawn onto each other to close the openings into said cylinders; and means for drawing said complementary surfaces into cylinder closing relation.

13. In combination, a motor body having a plurality of cylinders each opening through the circumferential surface of said body and having at least the portions of said circumferential surface which surround the radially outer ends of said cylinders all sloping in a direction toward the axis of said body means for supporting said motor body and through engagement with a supporting surface causing the propulsion of said motor body including an element having surface portions complementary to said body surface portions and of such areas as to cooperate with said latter surface portions in closing the ends of said cylinders, and means for effecting relation movement between said body and element to bring said surface portions into cylinder end-closing relation.

JOSEPH F. JOY.

REFERENCES CITED

The following references are of record in the file of this patent:

UNITED STATES PATENTS

| Number | Name | Date |
| --- | --- | --- |
| 123,130 | Sheldon | Jan. 30, 1872 |
| 388,522 | Beauchemin | Aug. 28, 1888 |
| 408,704 | Foulds et al. | Aug. 13, 1889 |
| 755,759 | Franzen | Mar. 29, 1904 |
| 841,776 | Graesicke | Jan. 22, 1907 |
| 1,110,313 | Davenport | Sept. 15, 1914 |
| 1,312,701 | Magie et al. | Aug. 12, 1919 |
| 1,485,986 | Magie et al. | Mar. 4, 1924 |
| 1,757,483 | Hele-Shaw | May 6, 1930 |
| 1,924,017 | Bedford | Aug. 22, 1933 |
| 1,529,270 | Pascolini | Mar. 10, 1925 |
| 1,484,960 | Peck | Feb. 26, 1924 |
| 1,688,591 | Mitton | Oct. 23, 1928 |
| 651,158 | Bergmann | June 5, 1900 |
| 2,281,541 | Ash | May 5, 1942 |
| 1,547,409 | Cacaud | July 28, 1925 |
| 1,773,587 | Lape | Aug. 19, 1930 |
| 1,803,932 | Dooley | May 5, 1931 |
| 832,518 | Wolcott | Oct. 2, 1906 |
| 1,819,677 | Galanti | Aug. 18, 1931 |
| 2,030,299 | Jack | Feb. 11, 1936 |
| 1,077,979 | Hele-Shaw | Nov. 11, 1913 |
| 1,077,980 | Hele-Shaw | Nov. 11, 1913 |
| 1,229,076 | Hayes | June 5, 1917 |
| 1,926,692 | Tarbox | Sept. 12, 1933 |

FOREIGN PATENTS

| Number | Country | Date |
| --- | --- | --- |
| 412,787 | British | July 5, 1934 |
| 16,882 | British | July 23, 1907 |
| 164,566 | British | June 16, 1921 |
| 418,052 | French | Sept. 17, 1910 |
| 12,574 | British | A. D. 1909 |